(12) United States Patent
Cohen et al.

(10) Patent No.: US 7,735,459 B2
(45) Date of Patent: Jun. 15, 2010

(54) MODULAR BOILER CONTROL

(75) Inventors: Kenneth W. Cohen, Fort Lee, NJ (US);
Richard Osienski, Westfield, MA (US);
Brian Hannigan, Chester, MA (US);
Mark Rawson, Chester, MA (US);
Nathaniel Dewey, Westfield, MA (US);
John Wilson, Westfield, MA (US)

(73) Assignee: Westcast, Inc., Westfield, MA (US)

( * ) Notice: Subject to any disclaimer, the term of this patent is extended or adjusted under 35 U.S.C. 154(b) by 395 days.

(21) Appl. No.: 11/763,628

(22) Filed: Jun. 15, 2007

(65) Prior Publication Data
US 2007/0295830 A1    Dec. 27, 2007

Related U.S. Application Data

(60) Provisional application No. 60/805,629, filed on Jun. 23, 2006.

(51) Int. Cl.
| F22B 37/42 | (2006.01) |
| F22D 5/00 | (2006.01) |
| G01M 1/38 | (2006.01) |
| G05B 21/00 | (2006.01) |
| G05B 13/00 | (2006.01) |
| G05B 15/00 | (2006.01) |
| G05D 23/00 | (2006.01) |
| B60H 1/03 | (2006.01) |
| B60H 1/22 | (2006.01) |
| F24D 19/10 | (2006.01) |

(52) U.S. Cl. ............... 122/448.3; 700/277; 700/278; 700/300; 237/2 A; 237/8 B

(58) Field of Classification Search ............... 700/275, 700/276, 278, 299, 300; 236/14; 237/2 R, 237/2 A, 7, 8 R, 8 A, 8 B; 122/448.1, 448.3
See application file for complete search history.

(56) References Cited

U.S. PATENT DOCUMENTS

| 4,037,779 | A | * | 7/1977 | Roy et al. ............... 237/8 R |
| 4,145,995 | A | * | 3/1979 | Kato ..................... 122/1 R |
| 4,534,321 | A | * | 8/1985 | Rydborn ............... 122/448.3 |
| 4,638,767 | A | * | 1/1987 | George ................. 122/448.3 |
| 4,681,066 | A | * | 7/1987 | Widhopf ................ 122/234 |
| 4,694,783 | A | * | 9/1987 | Cleer, Jr. ............... 122/448.3 |
| 6,145,295 | A | * | 11/2000 | Donovan et al. ........... 60/783 |
| 6,536,678 | B2 | * | 3/2003 | Pouchak ................... 237/7 |
| 7,158,525 | B2 | * | 1/2007 | Daffner et al. ........... 370/401 |
| 2002/0193890 | A1 | | 12/2002 | Pouchak |

FOREIGN PATENT DOCUMENTS

DE    3109670 A1 * 12/1981

(Continued)

*Primary Examiner*—Crystal J Barnes-Bullock
(74) *Attorney, Agent, or Firm*—McCormick, Paulding & Huber LLP

(57) ABSTRACT

A modular boiler system includes a boiler control, a first boiler in operative connection with the boiler control, and a temperature sensor in operative connection with the first boiler. The system also features at least one secondary boiler in operative connection with the master boiler. The boiler control is operatively connected to only the first boiler and it enables the first boiler to control a boiler parameter of the first boiler and the at least one secondary boiler.

19 Claims, 4 Drawing Sheets

FOREIGN PATENT DOCUMENTS

| DE | 3229265 A | * | 4/1983 |
| DE | 3311127 A1 | * | 10/1984 |
| DE | 3410316 A1 | * | 10/1985 |
| GB | 2157456 A | * | 10/1985 |
| JP | 2000205502 A | * | 7/2000 |

* cited by examiner

MODULAR BOILER CONTROL

CROSS REFERENCE TO RELATED APPLICATIONS

This application claims the benefit of U.S. Provisional Application Ser. No. 60/805,629, filed on Jun. 23, 2006, herein incorporated by reference in its entirety.

FIELD OF THE INVENTION

This invention relates generally to a modular boiler control, and more particularly to a modular boiler control in which a master boiler is networked with a least one slave boiler to control the heating loop of a structure.

BACKGROUND OF THE INVENTION

Known boiler systems include a boiler connected to an external control such as a thermostat or a building management system. The external control typically senses boiler temperature, controls boiler setpoint, performs outdoor reset functions and controls the boiler firing cycle.

In multiple boiler systems, each boiler is connected to a single centralized external control from which all boiler operations are performed. The centralized control typically performs the above-listed functions for each individual boiler as well as sequencing or staging the firing of all boilers to control heating throughout a structure. To accomplish this, each boiler is separately connected to the external control via wiring that is run within the structure to be heated. Moreover, boiler wiring is generally run through conduits to protect the wiring and ensure the reliability of the system.

As will be appreciated, multiple boiler systems can be costly to purchase and install as they require significant wiring from the external control to each individual boiler. In one known system, for example, control cables between a boiler control module and individual boilers consist of extended runs of 3-wire circuits. As stated, such wiring is typically protected with a conduit of plastic or like material, which requires installation.

Moreover, the addition of a boiler in known multiple boiler systems requires supplemental wiring to connect the new boiler to the external control. The subtraction of a boiler from such systems requires removal of control wiring which can also be costly. Further, the addition or subtraction of a boiler may also necessitate manually resetting or adjusting the external control, such as a building management system, to account for a changed number of total boilers. It is also possible that the existing external control may not have the capacity for an additional boiler and may require modification or replacement.

Additionally, if a boiler is not functioning properly or requires routine maintenance, it must be brought offline. In known systems, bringing an individual boiler offline can necessitate shutting the entire system down creating a no heat situation within a structure. Such system-wide shutdowns can be undesirable particularly when the outside air temperature is low. Further, if a boiler is not functioning properly manual adjustment of the external control may be necessary to adjust the firing of the other boilers to compensate for the faulted unit. Manual adjustment may also be required to bring a previously failed boiler back online if the fault resolves itself. As will be appreciated, manual adjustment of an external control can be time consuming and can result in periods of insufficient heat until adjustment is complete.

Furthermore, in known multiple boiler systems, individual boilers are typically fired in a first on/first off or first on/last off methodology. Neither of these approaches, however, directly assesses which individual boiler has the least runtime. As will be apparent, it is generally desirable to evenly distribute runtime among all boilers in a multiple boiler system. If runtimes are not uniformly distributed, premature maintenance of the more frequently used boilers may be necessary.

Finally, known external controls typically consist of numerous components. These components can include, for example, an outdoor air temperature sensor, an outdoor reset control, a control module and a terminal board. As will be appreciated, it is advantageous to reduce the number of required components to diminish the possibility of failure and reduce purchase and installation costs.

With the forgoing problems and concerns in mind, it is the general object of the present invention to provide a modular boiler control which overcomes the above-described drawbacks and which eliminates the need for a separate connection between individual boilers and a centralized external control in a multiple boiler system.

SUMMARY OF THE INVENTION

It is an object of the present invention to provide a modular boiler control.

It is another object of the present invention to provide a modular boiler control that reduces costs associated with installing a multiple boiler system by eliminating the need for wiring between each individual boiler and a centralized external control.

It is another object of the present invention to provide a modular boiler control that reduces costs associated with installing a multiple boiler system by networking a master boiler with at least one slave boiler wherein the master boiler functions as a centralized external control to regulate the networked slave boiler.

It is another object of the present invention to provide a modular boiler control that facilitates the addition of boilers to a multiple boiler system.

It is another object of the present invention to provide a modular boiler system that facilitates the addition of boilers to a multiple boiler system through a master boiler that automatically detects and controls a newly added/networked boiler.

It is another object of the present invention to provide a modular boiler control that facilitates the removal of a boiler from a multiple boiler system.

It is another object of the present invention to provide a modular boiler control that facilitates the repair or replacement of a failed boiler by automatically assigning a new boiler to replace the failed boiler allowing the failed boiler to be brought offline.

It is another object of the present invention to provide a modular boiler control that directly detects a boiler having the least runtime among multiple boilers and adjusts the boiler firing sequence to evenly distribute runtime among the boilers.

These and other objectives of the present invention, and their preferred embodiments, shall become clear by consideration of the specification, claims and drawings taken as a whole.

DETAILED DESCRIPTION OF THE PREFERRED EMBODIMENT

Figure 1:
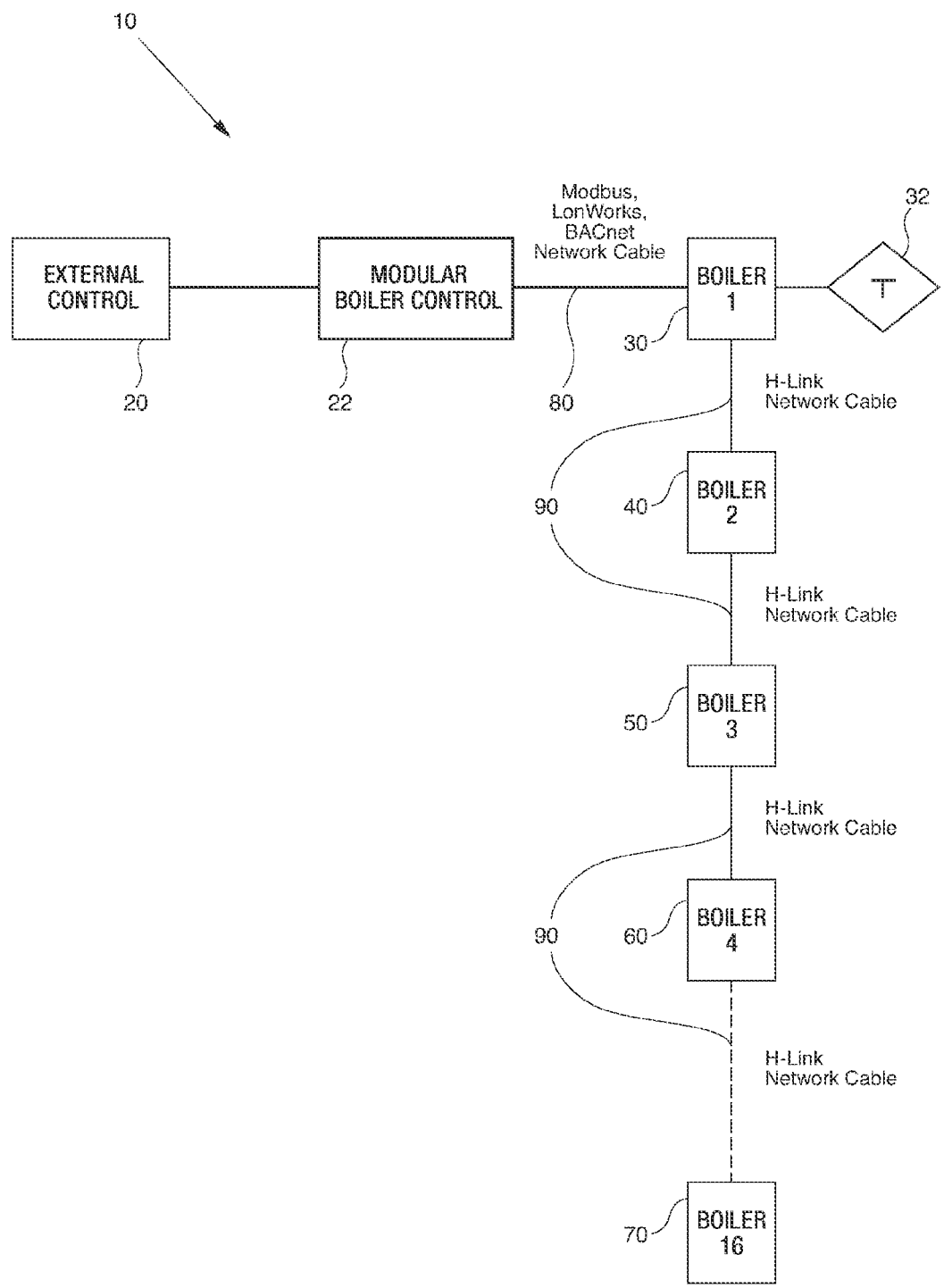
FIG. 1 is a simplified schematic diagram illustrating a multiple boiler system including a modular boiler control in accordance with an embodiment of the present invention.

FIG. 1 is a simplified schematic illustration of a multiple boiler system 10 featuring a modular boiler control 22 according to one embodiment of the present invention. As shown in FIG. 1, the system 10 includes an external control 20 such as a building management system or a thermostat, a modular boiler control 22, and multiple individual boilers 30, 40. The external control 20 is connected to a first boiler 30 via a network cable 80. The first boiler 30 is also operatively connected to a temperature sensor 32. In the system shown in FIG. 1, the first boiler 30 is the "master boiler" as it is operatively connected to the system temperature sensor 32. The remaining secondary boilers, i.e., the "slave boilers" 40 are serially connected to the master boiler 30, and to each other, by way of network cables 90. The master boiler is, by definition, the boiler connected to a system temperature sensor. As will be appreciated, the master boiler does not need to be the boiler directly connected to the modular boiler control 22.

Preferably, the master boiler 30 performs several functions, typically referred to as "wall-mount" functions, which are carried out by an external control such as a building management system. These functions include sensing system temperature, controlling system setpoint, controlling outdoor reset and ratio, and staging/firing the master and slave boilers. The master boiler 30 is also capable of communication with the external control 20 which, as stated above, may be a simple thermostat or a more complex building management system.

As will be readily apparent, having the master boiler perform wall-mount functions and control slave boilers through a serial connection is an important aspect of the present invention. In known multiple boiler systems, each boiler is independently connected to the external control through control wiring. With the present system, a single master boiler is connected to an external control eliminating the need for separate control wiring and protective conduit between the control and each system boiler. As such, the present system reduces costs associated with the installation of a multiple boiler system.

As shown in FIG. 1, a first slave boiler 40 is serially connected to the master boiler 30 via network cable 90. Likewise, each slave boiler is serially connected to the adjacent slave boiler through the use of network cables 90. Preferably, the master 30 and slave boilers 40, 50, 60 and 70 are all interconnected through RS485 serial lines. The master boiler 30 is also serially connected via a network cable 80 to the controller 22, which, in turn, is serially connected to the external control 20. These connections are also preferably RS485 serial lines. As will be appreciated, however, other connecting hardware may be employed provided it allows the master boiler 30 to effectively communicate with the slave boilers. The preferred network protocol is Modbus RTU although other serial communications protocol may be utilized such as LonWorks® or BACnet®.

The master boiler 30 controls the slave boilers 40, 50, 60, 70, through a control algorithm that resides in software in the modular boiler control 22. The control algorithm is yet another important aspect of the present invention as it allows the master boiler 30 to perform the wall-mount tasks typically associated with an external control. Moreover, the algorithm allows for the adjustment of the total number of boilers and their firing rates to achieve a system setpoint temperature. The control algorithm also allows for the automatic detection and recognition of all networked boilers. The modular boiler control 22 is also capable of sensing and controlling optional components such as pumps, dampers, valves and additional sensors.

Automatic boiler detection is a significant feature of the present invention as it simplifies and reduces costs associated with the setup process when installing a multiple boiler system. To setup the present system, a unique address is assigned to each of the installed boilers and a network cable is connected between each boiler. As stated previously, the boiler that has a temperature sensor attached becomes the master boiler. All connected slave boilers are then automatically detected and configured to maintain a system setpoint. This process is analogous to a "plug and play" arrangement and greatly simplifies the installation of a multi-boiler system.

Figure 2:
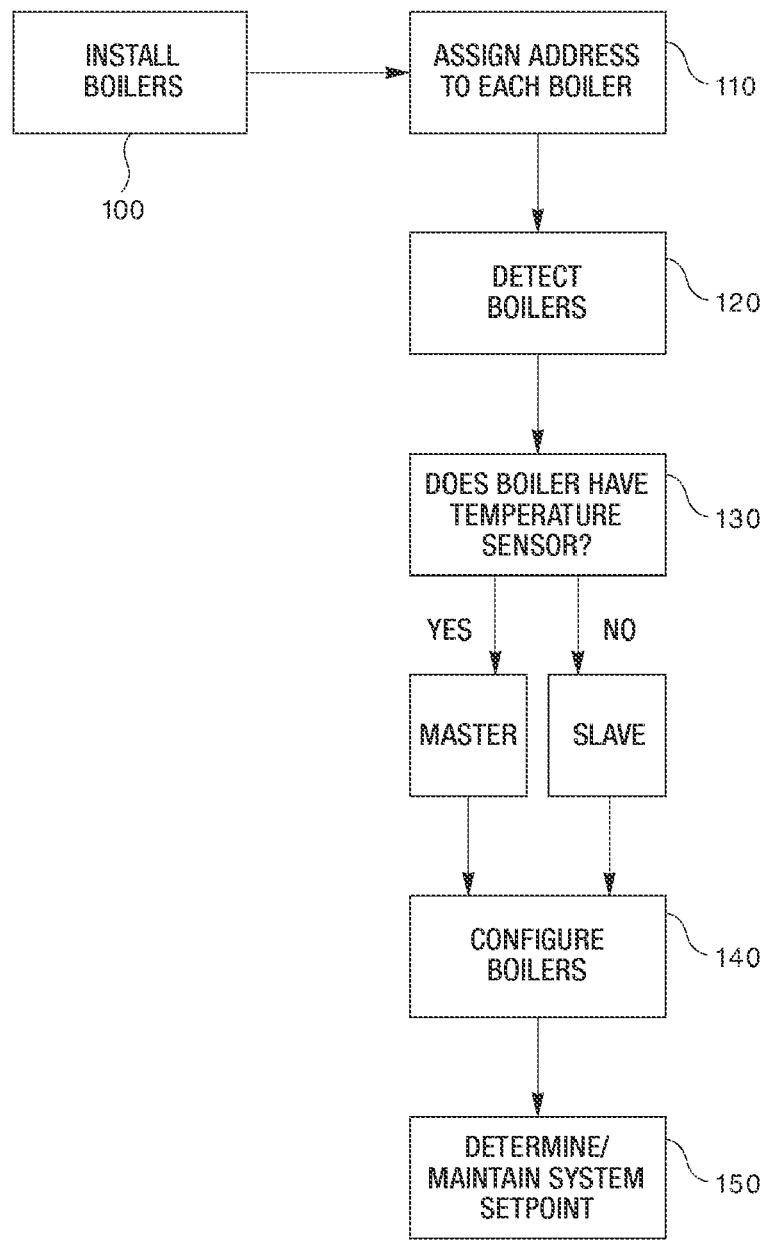
FIG. 2 is a flowchart illustrating a simplified boiler setup subroutine of a modular boiler control in accordance with an embodiment of the present invention.

A simplified automatic detection subroutine of the present invention is illustrated in FIG. 2. At an initial step 100, the boilers and modular boiler control are installed and network cables connected. As shown at step 110, a unique address is then assigned to each boiler. All system boilers are then automatically detected by the modular boiler control, as shown at step 120. If a networked boiler is connected to a temperature sensor in step 130, it is designated the master boiler. All other networked boilers are designated as slave boilers. As illustrated at step 140, after the boilers have been designated as master or slave, they are configured and, at step 150, a setpoint is determined and maintained for the entire system.

The control algorithm also allows the master boiler to adjust the firing rate of networked slave boilers and assign a new slave boiler should one of the slaves go into a fault condition. The algorithm also allows a boiler to be brought off-line for maintenance without impacting the system.

Figure 3:
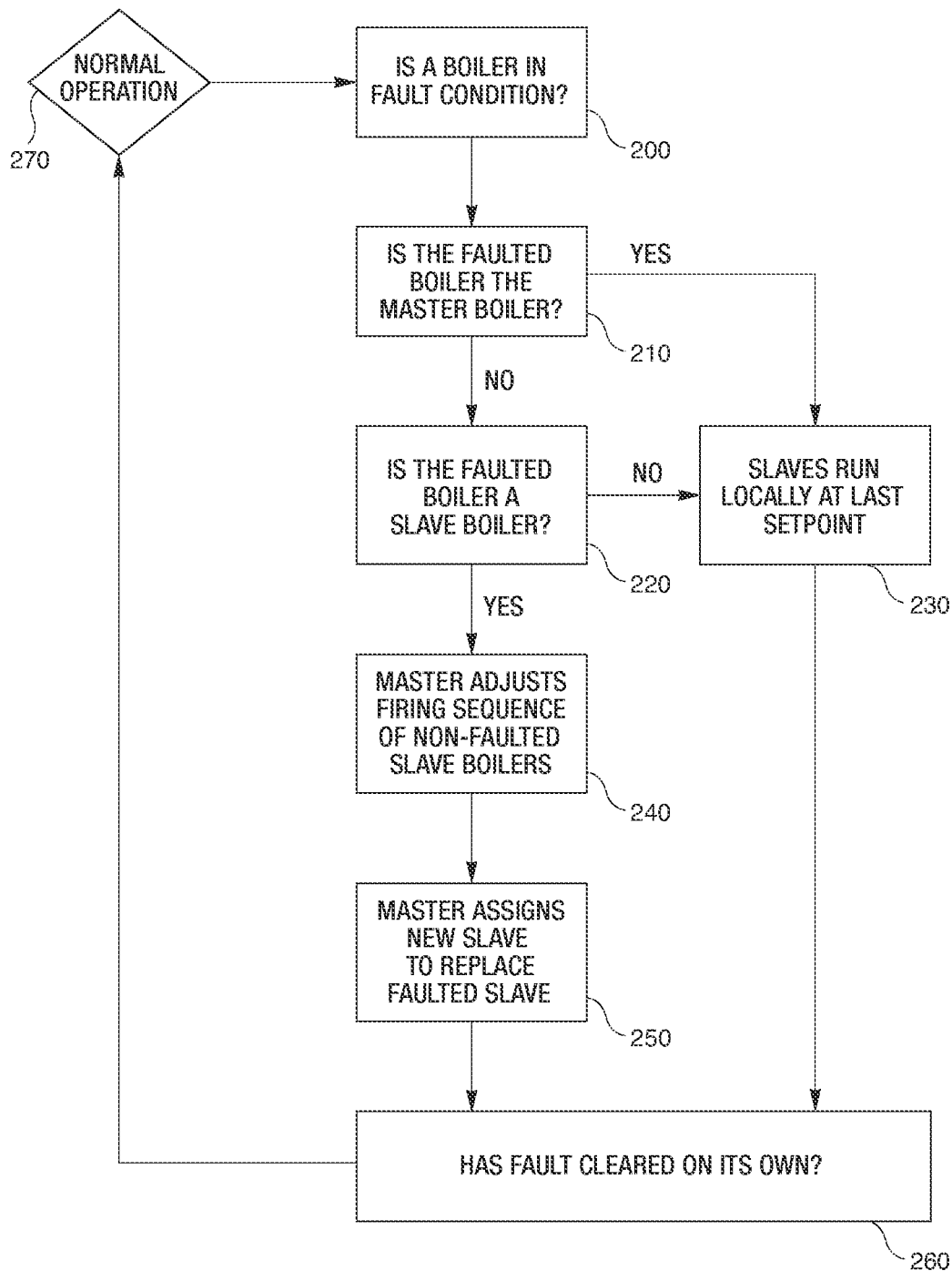
FIG. 3 is a flowchart illustrating a simplified boiler fault subroutine of a modular boiler control in accordance with an embodiment of the present invention.

A simplified boiler fault subroutine of the present invention is shown in FIG. 3. As shown at step 200, the modular boiler control automatically detects whether a boiler is in a fault condition. The control then determines whether the faulted boiler is the master or a slave at steps 210 and 220 respectively. As shown at step 230, if the master has faulted, the slaves will run locally at the last system setpoint. If the faulted boiler is a slave, then master adjusts the firing sequence of the non-faulted slave boilers and assigns a new slave to replace the faulted boiler, steps 240 and 250 respectively. Finally at step 260, the modular boiler control automatically detects whether the fault has resolved itself on its own. If so, the system returns to normal operation at step 270.

Additionally, the algorithm directly determines the boiler(s) that has the least runtime and automatically adjusts the firing sequence to uniformly distribute runtime among all system boilers. With the present system, the runtime for each boiler can be weighted to the either the Maximum BTU output/Mean Time to Failure Rate or the percentage of modulation/BTU output.

Figure 4:
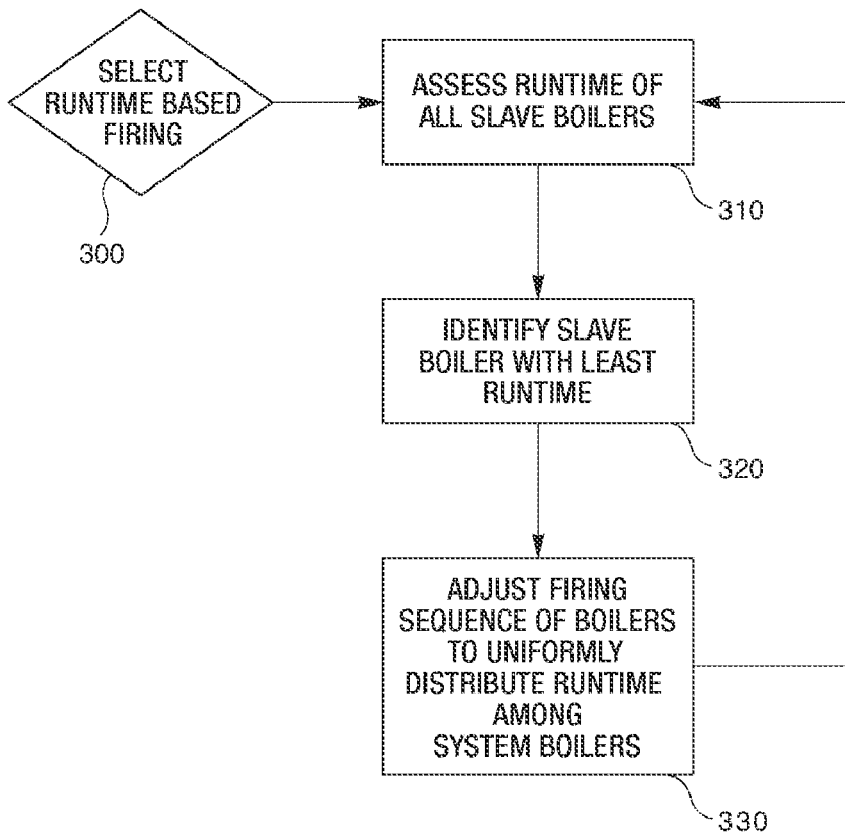
FIG. 4 is a flowchart illustrating a simplified boiler runtime subroutine of a modular boiler control in accordance with an embodiment of the present invention.

A simplified runtime subroutine of the present invention is depicted in FIG. 4. As shown at step 300, a user selects runtime-based boiler firing. Upon selection, the modular boiler control directly assesses the runtime of each slave boiler, as shown at step 310. The control then identifies the boiler with the least runtime (step 320) and then adjusts the firing sequence of all of the system boilers to uniformly distribute runtime (step 330).

The distribution of boiler runtime is yet another important aspect of the present invention as known multiple boiler systems are typically fired on a first on, first off or first on, last off protocol and do not consider runtime. As will be apparent, it is generally desirable to evenly distribute runtime among all boilers in a multiple boiler system. If runtimes are not uniformly distributed, premature maintenance of the more frequently used boilers may be necessary.

Moreover, the system uses a predictive algorithm to determine when to fire/stop firing a boiler before its process input variable, e.g., system temperature, moves too far from its setpoint. The method looks at the slope (mx+b) of the process input variable over a boiler "to be fired" time period and predicts when to start and stop the boiler based on its BTU output. This slope method is also used to dynamically adjust the firing rate to control over and undershoots of the process input variable.

In sum, the present invention provides a modular boiler control that eliminates the need for separate control wiring from each boiler in a multiple boiler system to an external control. Moreover, the present invention allows for automatic detection and setup of networked boilers and for a master boiler to control the setpoint and firing sequence of multiple slave boilers. The present invention also directly measures boiler runtime to identify the boiler with the least runtime and adjust the firing sequence of the other boilers for even runtime distribution.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

We claim:

1. A modular boiler system comprising;
   a first boiler;
   at least one secondary boiler in operative connection with said first boiler;
   a boiler control connected to one of said first or secondary boilers;
   an external control connected to one of said first or secondary boilers;
   a temperature sensor connected to said first boiler;
   wherein said boiler control enables said first boiler to control a boiler parameter of said first boiler and said at least one secondary boiler.

2. The modular boiler system of claim 1 wherein said boiler control is networked with said first boiler and at least one secondary boiler through a serial connection between said boiler control and said first boiler and a serial connection between said first boiler and said at least one secondary boiler.

3. The modular boiler system of claim 1 wherein said boiler parameter is temperature set point, a firing rate or a firing sequence of said first boiler and said at least one secondary boiler.

4. The modular boiler system of claim 1 wherein said external control is a thermostat.

5. The modular boiler system of claim 1 wherein said external control is a building management system.

6. The modular boiler system of claim 1 wherein said boiler control automatically detects each of said first and secondary boilers in said modular boiler system.

7. The modular boiler system of claim 1 wherein said boiler control adjusts a firing rate of said secondary boilers and assigns a new secondary boiler to replace a faulted secondary boiler.

8. The modular boiler system of claim 1 wherein said boiler control assesses a firing rate for each of said first and secondary boilers and then identifies a boiler with the least runtime from said first and secondary boilers and then adjusts a firing sequence of said first and secondary boilers in response to said identification of said boiler with the least runtime.

9. A boiler control for a multiple boiler system said boiler control comprising;
   a serial connector for operatively connecting a first boiler to said boiler control;
   a control algorithm residing in software in said boiler control; and
   wherein said control algorithm allows said first boiler to control a boiler parameter of said first boiler and of at least one secondary boiler serially connected to said first boiler.

10. The boiler control of claim 9 wherein said boiler parameter is a temperature set point, a firing rate or a firing sequence for said first boiler and said at least one secondary boiler.

11. The boiler control of claim 10 wherein, in response to a faulted secondary boiler, said algorithm adjusts said firing rate of said secondary boilers and assigns a new secondary boiler to replace said faulted secondary boiler.

12. The boiler control of claim 10 wherein said boiler control assesses a firing rate for each of said first boiler and said at least one secondary boiler and then identifies a boiler with the least runtime from said first and at least one secondary boiler and then adjusts a firing sequence of said first and at least one secondary boiler in response to said identification of said boiler with the least runtime.

13. The boiler control of claim 9 wherein said first boiler is in operative connection with a temperature sensor and said first boiler assesses a temperature for said first boiler and said at least one secondary boiler.

14. A method of installing and operating a serial network of multiple boilers comprising the steps of;
   installing a first boiler that is in operative communication with a temperature sensor;
   serially connecting said first boiler to a boiler control;
   serially connecting at least one secondary boiler to said first boiler; and
   assigning an address to said first boiler and said at least one secondary boiler.

15. The method of claim 14 further comprising the steps of;
   automatically detecting all boilers serially networked with said boiler control; and
   automatically configuring all boilers serially networked with said boiler control.

16. The method of claim 15 wherein said boiler control controls a boiler parameter of said first boiler and said at least one secondary boiler.

17. The method of claim 16 wherein said boiler parameter is a temperature set point, a firing rate, or a firing sequence of said first boiler and said at least one secondary boiler.

18. The method of claim 17 wherein said boiler control, in response to a faulted secondary boiler, said boiler control adjusts a firing rate of said secondary boilers and assigns a new secondary boiler to replace said faulted secondary boiler.

19. The method of claim 17 wherein said boiler control assesses a firing rate for each of said first and at least one secondary boilers and then identifies a boiler with the least runtime from said first and secondary boilers and then adjusts a firing sequence of said first and secondary boilers in response to said identification of said boiler with the least runtime.

* * * * *